US009508478B1

(12) United States Patent
Honein et al.

(10) Patent No.: US 9,508,478 B1
(45) Date of Patent: Nov. 29, 2016

(54) DIAMAGNETIC LEVITATION SYSTEM FOR SPORT FIELD USE IN A STADIUM

(71) Applicants: Philip Honein, Billerica, MA (US); Michael Lee Fraim, Rio Rancho, NM (US)

(72) Inventors: Philip Honein, Billerica, MA (US); Michael Lee Fraim, Rio Rancho, NM (US)

(*) Notice: Subject to any disclaimer, the term of this patent is extended or adjusted under 35 U.S.C. 154(b) by 83 days.

(21) Appl. No.: 14/724,721

(22) Filed: May 28, 2015

Related U.S. Application Data

(63) Continuation-in-part of application No. 14/079,517, filed on Nov. 13, 2013, now abandoned.

(51) Int. Cl.
| | | |
|---|---|---|
| H01F 1/00 | (2006.01) | |
| H01F 7/02 | (2006.01) | |
| H01F 6/04 | (2006.01) | |

(52) U.S. Cl.
CPC .............. *H01F 7/0236* (2013.01); *H01F 6/04* (2013.01)

(58) Field of Classification Search
CPC ........ H02N 15/00; B60L 13/10; B60L 13/04
USPC .................................. 336/316, 296, 302, 306
See application file for complete search history.

(56) References Cited

U.S. PATENT DOCUMENTS

| | | | |
|---|---|---|---|
| 5,287,026 A * | 2/1994 | Ogihara et al. ............ | 310/12.21 |
| 5,375,531 A | 12/1994 | Ogihara et al. | |
| 6,162,364 A | 12/2000 | Tillotson et al. | |
| 6,850,137 B2 | 2/2005 | Bird et al. | |
| 7,482,154 B2 | 1/2009 | DePaola et al. | |
| 7,597,002 B2 | 10/2009 | Moser et al. | |
| 7,827,993 B2 | 11/2010 | Cameron et al. | |
| 7,859,157 B2 | 12/2010 | Baur | |

(Continued)

FOREIGN PATENT DOCUMENTS

WO    WO 2006097785 A1    9/2006

OTHER PUBLICATIONS

Douglas et al (Journal of Physics Special Topics; "A2_3 Diamagnetic Levitation of a Human"; Douglas G.J.M, Marshall D.A., Griffiths I., Hands T.O.; Department of Physics and Astronomy, University of Leicester, Leicester, LE1 7RH; Nov. 8, 2011 (https://physics.le.ac.uk/journals/index.php/pst/article/view/430/301).
John Schenck, Med. Phys. 23(6), Jun. 1996, pp. 815-850, "The role of magnetic susceptibility in magnetic resonance imaging: MRI magnetic compatibility of the first and second kinds".

(Continued)

*Primary Examiner* — Bernard Rojas
(74) *Attorney, Agent, or Firm* — Gerald M. Walsh; Leo Law Firm, LLC

(57) ABSTRACT

A diamagnetic levitation system for levitating users to a levitation surface upon which they may engage in sports and other activities under relatively weightless conditions in a dome-shaped structure. Superconducting magnet segments are connected in series to form a superconducting magnet segment assembly. A plurality of these superconducting magnet segment assemblies form the diamagnetic levitation system. The diamagnetic levitation system not only generates the levitation surface to which players or other users are levitated but also confines them within the boundaries of the levitation surface. The magnetic field strength of the diamagnetic levitation system is self-terminating so that spectators viewing the players are not affected by the levitating magnetic field.

16 Claims, 5 Drawing Sheets

(56) References Cited

U.S. PATENT DOCUMENTS

| | | |
|---|---|---|
| 8,169,114 B2 | 5/2012 | Simon |
| 8,317,682 B2 | 11/2012 | Kawano et al. |
| 8,360,999 B2 | 1/2013 | Leung et al. |
| 9,124,196 B1 * | 9/2015 | Honein et al. |
| 2002/0147424 A1 | 10/2002 | Ostrow et al. |
| 2003/0187320 A1 | 10/2003 | Freyman |
| 2006/0162452 A1 | 7/2006 | Moser et al. |
| 2009/0160279 A1 | 6/2009 | Baur |
| 2010/0036394 A1 | 2/2010 | Mintz et al. |

OTHER PUBLICATIONS

Geim, Andrey, "Everyone's Magnetism", Physics Today, September, pp. 36-39, 1998.

Berry, MV and Geim, AK, Of Flying Frogs and Levitrons, Eur. J. Physics, 18: 307-313, 1997.

Liu, Y, Zhu, D, Strayer, DM, and Israelsson, UE, Magnetic Levitation of Large Water Droplets and Mice, Advances in Space Research 45: 208-213, 2010.

* cited by examiner

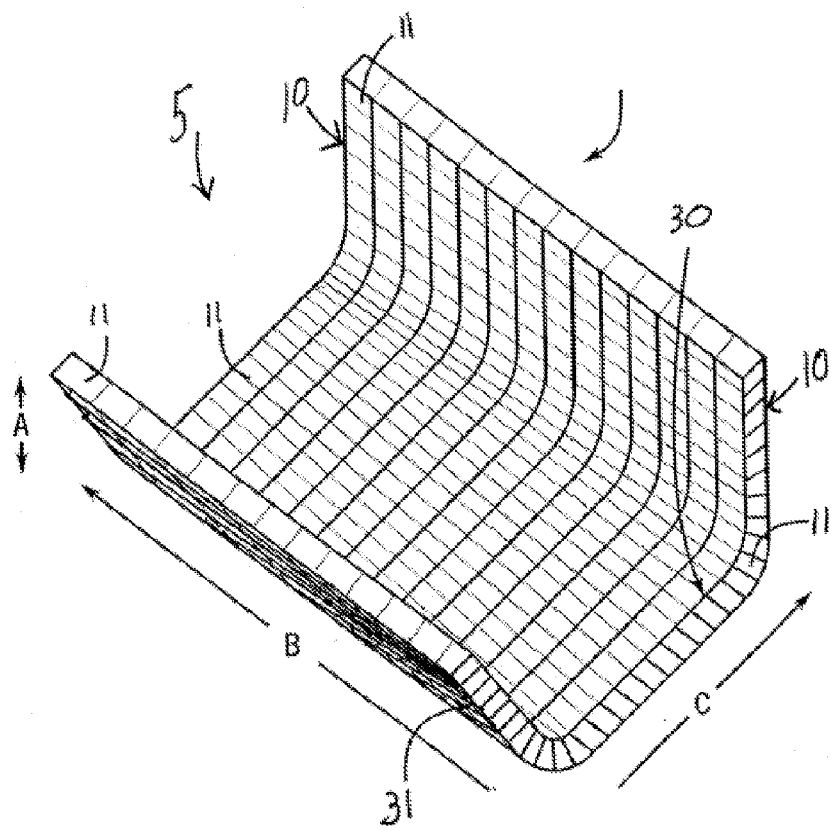
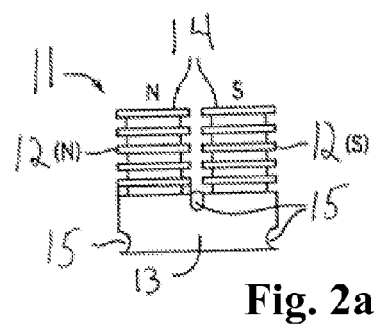
Fig. 2a
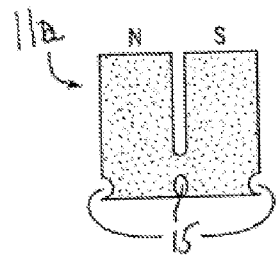
Fig. 2c
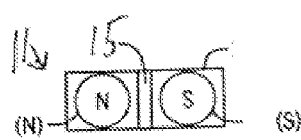
Fig. 2b
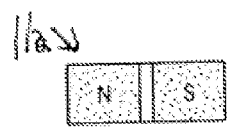
Fig. 2d

DIAMAGNETIC LEVITATION SYSTEM FOR SPORT FIELD USE IN A STADIUM

CROSS-REFERENCE TO RELATED APPLICATIONS

This application claims priority to U.S. Nonprovisional patent application Ser. No. 14/079,517 filed Nov. 13, 2013.

FIELD OF THE INVENTION

The present invention relates generally to superconducting levitation magnets and, more particularly, to an apparatus and method for levitating human players (users) onto a diamagnetic levitation playing surface produced by assemblies of superconducting magnet segments forming a diamagnetic levitation system, wherein the players may play any desired sport or game while levitated on the playing surface within a covered structure such as a stadium.

BACKGROUND OF THE INVENTION

The use of a magnetic field to levitate a diamagnetic material is known in the prior art. Superconducting magnets have been used to levitate diamagnetic objects such as water, frogs, pyrolytic graphite plates, and the like. The classic superconducting magnetic coil design cannot be used to create a magnetic levitation playing field in a stadium or arena because the huge magnetic field that is produced is not self-terminating. If a classic superconducting magnetic coil design were used in a stadium or arena the local magnetic north pole would be shifted in the surrounding area and might alter local air traffic and vehicle compasses. Magnetic strips or smart phone memory of spectators in the stadium or arena would be erased and any metallic items such as keys, spoons, knives, and supports in shoes would be immediately attracted to the field surface.

The most popular scientific demonstration model of magnetic levitation uses a plate of pyrolytic graphite or super conducting metal and a 4 by 4 array of strong ceramic magnets setup in a checker board pattern (N-S-N-S by S-N-S-N). This checker board pattern creates huge magnetic flux gradients across each square because the magnetic field lines are bent 180 degrees to enter or exit each ceramic magnetic piece both at the top and bottom of the magnetic array.

At 3 times the dimension of the side of the square magnet, the magnetic field strength from the checker board design is almost zero even with a magnetic field strength of 16 Tesla. An important characteristic of this design is near zero field strength decay, eliminating the need for magnetic shielding of spectators in a stadium or arena. The magnetic field is self-terminating so spectators in a stadium or arena would not be affected by the magnetic field.

U.S. Pat. No. 6,850,137 discloses an apparatus and method for levitating a diamagnetic material using a magnetic field produced by a superconducting magnet. Concentric superconducting coils produce magnetic fields when energized with current. The magnetic fields of the coils combine to produce an operational magnetic field for levitating the diamagnetic material inside a central bore.

U.S. Pat. No. 8,317,682 and U.S. Patent Application 2010/0036394 demonstrate how to use a three dimensional magnetic field to control the movement of a diamagnetic medical device. A strong magnetic field parallel to the gravitational force is used to levitate the medical device in space while smaller magnetic fields perpendicular to the gravitational force are used to overcome drag force of moving the medical device inside a body cavity. Even smaller alternating electromagnetic fields are used to locate the position and orientation of the device in the body and for communication with sensors on the device.

U.S. Pat. No. 6,162,364 discloses a system for diamagnetic manipulation of an object in a surrounding medium in a low gravity environment. If a diamagnetic object is suspended in a fluid that has a lower diamagnetic value than the object, it can move away from the electromagnet when the magnet is turned on. Thus, with a plurality of electromagnets, the position and orientation of the object can be controlled in space.

U.S. Patent application 2006/0162452 discloses an inertial sensor based on diamagnetic levitation. The inertial sensor has a support means and a two dimensional array of permanent magnets. A diamagnetic element faces the array of magnets and through diamagnetic levitation the diamagnetic material constitutes the inertial sensor.

U.S. Pat. No. 8,360,999 discloses a method for suspending a plate to generate vibrations in the plate at approximately 35 Hz with a magnitude of 0.5 g. The plate is suspended with permanent magnetic levitation and the vibrations are created with electromagnetic repulsion and attraction. The method can be used for the treatment or prevention of musculoskeletal indications.

At present, there are no suitable diamagnetic levitation system designs for large playing fields to produce weightless simulation for use in stadiums, arenas, superdomes, theaters, universities, and the like

SUMMARY OF THE INVENTION

The invention is a diamagnetic levitation system for levitating users to a diamagnetic levitation surface. The diamagnetic levitation system has open horseshoe or U-shaped superconducting magnet segments connected in series to form a superconducting magnet segment assembly. A plurality of these superconducting magnet segment assemblies are connected in series to form a U-shaped diamagnetic levitation system which generates the diamagnetic levitation surface. The superconducting magnet segments are, preferably, constructed of super-alloy metal plates, metal glass, or compacted metal powder. Each of the superconducting magnet segment assemblies have surface magnet segments which maintain the diamagnetic levitation surface and edge magnet segments which prevent objects and users from falling off the sides of the diamagnetic levitation surface. Each of the superconducting magnet segments have one or more cryogenic cooling tubes to cool the superconducting magnet segment to a superconducting temperature with cryogenic liquid. The cooling tubes have internal spiral fins to produce a uniform film coating of the cryogenic liquid on an interior surface of the cooling tubes. Gas bubbles generated from heat absorption by the cryogenic liquid travel down a center of the tube. The cooling fins have a pitch angle of 5 to 25 degrees and the cryogenic liquid spins so that the cryogenic liquid boils on the interior surface of the cooling tubes.

Each superconducting magnet segment generates a magnetic field strength up to 30 tesla. The superconducting magnet segment assemblies have magnetic insulation, cryogenic insulation, and dry gas channels. The dry gas channels provide jets of air or nitrogen gas. The cryogenic insulation has transpiration therethrough of the jets of air or nitrogen gas to prevent condensation on the superconducting magnet segment. The air or nitrogen gas is released through the cryogenic insulation to the outside environment. Fiber optic temperature detectors follow the dry gas channels to monitor temperature over the diamagnetic levitation surface.

The diamagnetic levitation system has a nonmagnetic frame to support and retain the diamagnetic levitation system. The magnetic field strength of the diamagnetic levitation system is at least 90% of the earth's magnetic field at distances from the diamagnetic levitation system greater than three times the width of the superconducting magnet segment.

An object of the invention is to provide a very large surface area for diamagnetic levitation of players. The players can be levitated in near frictionless air, gas, or vacuum environments. Players can experience the feeling of living and traveling in space. Geriatric and obese patients can exercise and move in a low gravity environment across the surface. Extreme sports players can perform amazing stunts in a low gravity environment or provide a very safe landing zone for practice of stunts. Even new forms of dancing, gymnastics, diamagnetic skating could be created and demonstrated in a low gravity environment.

The large diamagnetic levitation surface has an internal magnetic shielding design so spectators can watch the activity on the levitation field or surface without being exposed to the strong magnetic fields, thereby avoiding effects such as credit card erasing or smart phone memory wipe. Thus, spectator seating can be close to a playing surface such as a basketball court in an arena or a stage in a theater.

An advantage of the present invention is that it can be constructed in any size or shape desired such as a soccer field or basketball court.

Another advantage is that levitating magnetic field is self-terminating so spectators in a stadium or arena would not be affected by the magnetic field.

Another advantage is that the levitating magnetic field has magnetic edges which prevent players from falling off the sides of the playing surface.

Another advantage is a levitation of players that is very safe.

BRIEF DESCRIPTION OF THE DRAWINGS

FIG. 1 illustrates a diamagnetic levitation system of the present invention comprising magnet segment assemblies arranged in series with each magnet segment assembly comprising magnet segments arranged in series.

FIG. 2a illustrates a compact two-pole magnet segment with cryogenic cooling channel slots and having two superconducting coils with opposite polarity.

FIG. 2b shows a top view of the magnet segment of FIG. 2a.

FIG. 2c illustrates a single-pole amorphous superconducting metal alloy magnet segment.

FIG. 2d shows a top view of the magnet segment of FIG. 2c.

DETAILED DESCRIPTION OF THE INVENTION

Figure 3:
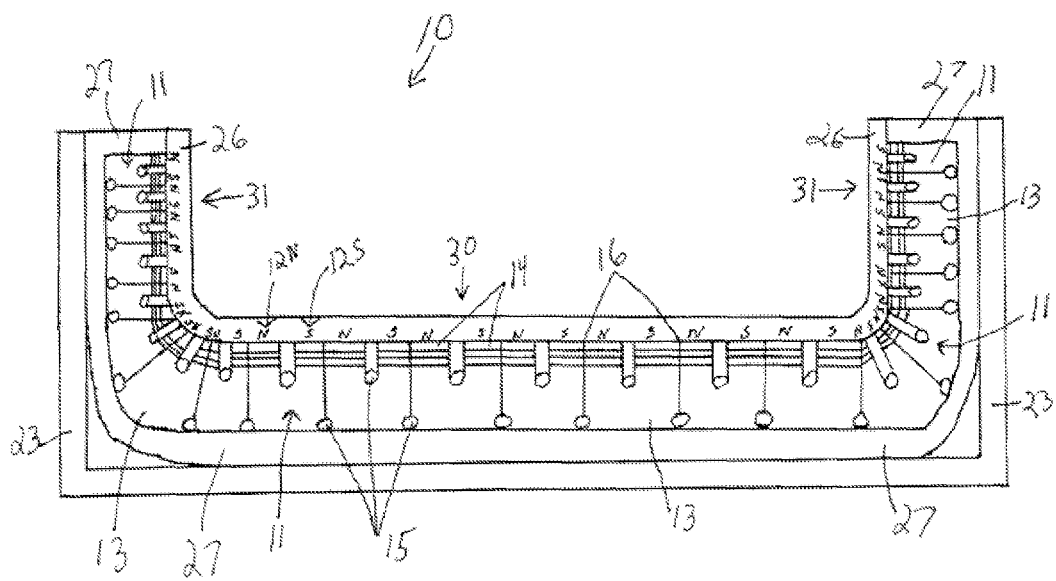
FIG. 3 shows a magnet segment assembly comprising magnet segments arranged in series to form a horizontal platform with vertical sides.

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Based upon a publication by John Schenk ("The role of magnetic susceptibility in magnetic resonance imaging: MRI magnetic compatibility of the first and second kind," February 1996) the magnetic force is proportional to the magnetic field times the gradient times the magnetic susceptibility and the gravitation force is proportional to the density:

$F_{mag} = (\chi_{av} V / \mu_o) B \, dB/dh$ $F_g = \rho_{av} V g$

Where:

$\rho_{av} = (1-x)\rho_{human} + x\rho_{carbon}$ $\chi_{av} = (1-x)\chi_{human} + x\chi_{carbon}$ Setting Forces equal and solving for B:

$B \, dB = \rho_{av} g / (\chi_{av}/\mu_o) \, dh$

Solving:

$B = (\rho_{av} g / (\chi_{av}/\mu_o) h)^{0.5}$

Engineering values from Table V of the John Schenk publication for magnetic susceptibility for human and carbon graphite (−8.9 ppm and −204 ppm), density for human and carbon graphite (1040 and 2200 kg/m$^2$), and magnetic permeability of 1.25 ppm are used to calculate magnetic flux density (Tesla). Assuming a human is 1.8 m tall and 0.3 m thick, and a carbon fiber space suit is constructed with 10% volume of the human inside, B equals 12.2 T for a human oriented perpendicular to gravity (laying down) and B equals 30 T for a human parallel to gravity force (standing up). For sport activities requiring the human to be parallel to gravitational force, then a space suit with 15% carbon fiber volume ratio can be used to reduce B to 26.5 T. Magnets of this strength are feasible to build as disclosed in U.S. Pat. No. 7,609,139 and in US Publication No. 2008/0242551.

The present invention is a diamagnetic levitation system which incorporates open compact horseshoe or U-shaped magnet segments. Each arm of the U shape has a superconducting coil with the arms having opposite polarity (North and South). The U-shaped magnet segments can be preassembled in square shapes in 1×2, 2×2, 2×4, 4×4 or higher even number of poles. The magnet segments also have a rectangular configuration and are joined together to form a magnet segment assembly. A plurality of magnet segment assemblies are joined together on the playing field to form the diamagnetic levitation system. The diamagnetic levitation system is attached to a heavy-duty non-magnetic metal frame to support the weight of the magnets and the compression force of the magnetic field. The frame can also carry a cryogenic, two-phase cooling system for the superconducting magnet segments.

Each of the superconducting magnet segments can be constructed of thin metal plates or amorphous metal glass to prevent magnet eddies in the metal structure which in turn prevents heating of the metal by an oscillating magnetic field. The plates have an oxide coating to prevent melding during the brazing process. The plates are oriented so the magnetic field can travel from one pole to the other pole in the four side directions without crossing the oxide layers.

The cooling system uses a cooling tower or geothermal heat exchanger for final rejection of the heat to the environment. A three stage cryogenic cooling system can be used to maximize the efficiency of the heat transfer. The heat exchanger tubes for the magnet segments containing the cryogenic nitrogen or helium gas/liquid mixture can spin the two-phase fluid so the liquid can boil on the complete internal surface of the tube while the gas travels down the center of the tube. Fiber optic sensors can record the temperature along the magnet assemblies to search for hot spots in the magnetic array.

A layer of water or very low vapor pressure fluorocarbon or chlorocarbon liquid can be levitated on the playing field surface to give players or participants the feeling of friction for training on the playing field. For safety, new players can be exposed to weightless environment with a viscous suspended fluid or rope net across the field to allow them to learn how to move and stop in a low friction environment. Players can walk or swim in the suspended fluid to move around the field or pull themselves across the field.

An object of the invention is to provide a very large surface area for diamagnetic levitation of players. The players can be levitated in near frictionless air, gas, or vacuum environments. Players can experience the feeling of living and traveling in space. Geriatric and obese patients can exercise and move in a low gravity environment across the surface. Extreme sports players can perform amazing stunts in a low gravity environment or provide a very safe landing zone for practice of stunts. Even new forms of dancing, gymnastics, diamagnetic skating could be created and demonstrated in a low gravity environment.

The large diamagnetic levitation surface has an internal magnetic shielding design so spectators can watch the activity on the levitation field or surface without being exposed to the strong magnetic fields, thereby avoiding effects such as credit card erasing or smart phone memory wipe. Thus, spectator seating can be close to a playing surface such as a basketball court in an arena or a stage in a theater. Magnetic metal alloy is used on the sides and bottom of the field to contain the magnetic field to the playing surface area.

Players can also be levitated in a liquid environment. Liquid provides viscous friction for a player to move around within a totally weightless and frictionless environment. Players could swim or float across the liquid surface if the liquid has a diamagnetic coefficient less than the human body. The diamagnetic levitation would also allow the body muscles to totally relax which would have therapeutic benefit, for example, the relief of stress on compressed nerves in bone joints of the back and for relief of pain associated with vertebral disk problems.

In order to build a large levitating playing field, the compact horseshoe or "U" shaped superconducting magnets can be constructed with high precision cut metal alloy material, such as supermendur or supermalloy, to contain a high magnet field strength of up to 30 Tesla in the radius of the U-shaped diamagnetic levitation system. Cryogenic cooling systems are required for an assembly of superconducting magnets. Liquid nitrogen or helium can be used to cool the magnet assembly. The cooling plumbing system can be designed for two phase (liquid and vapor) flow and heat transfer. A thin layer of thermal insulation can be used to isolate the magnets from the playing environment. The thermal insulation can prevent ice or gas hydrate build up on the field playing surface that could cause a safety hazard when an ice plate breaks away and levitates to the level of the playing field. Dry nitrogen gas can be transpired through the thermal insulation to prevent water vapor condensation build up on the thermal insulation.

FIG. 1 illustrates a perspective view of a rectangular diamagnetic levitation system 5 of the present invention comprising magnet segment assemblies 10 arranged in series, along the direction of arrow B, with each magnet segment assembly 10 comprising magnet segments 11 arranged in series, along the direction of arrows C and A. The diamagnetic levitation system 5 can have any desired height A, for example 3 to 20 feet, any desired length B, for example 10 to 500 feet, and any desired width C, for example 10 to 100 ft. The magnet segments 11 along a horizontal plane, shown by arrow C, are surface magnet segments 30. The magnet segments 11 along a vertical plane, shown by arrow A, are edge or side magnet segments 31. The diamagnetic levitation system encloses and defines the area for the diamagnetic levitation surface. Spectators can view from above the diamagnetic levitation surface safely because at distances greater than 3 to 5 times the magnet segment width, the magnetic field is at least 90% of the earth's magnetic field strength.

The diamagnetic levitating surface is constructed from two-pole magnet segments 11. FIG. 2a illustrates a compact two-pole magnet segment 11 with cryogenic cooling channels 15 and two superconducting coils with opposite polarity 12(N) and 12(S). The magnet segment 11 uses the two superconducting coils 12(N) and 12(S) and super-alloy plates 13 to generate an intense magnetic field up to 30 Tesla. The cooling channels 15 are used to cryogenically cool the magnet segments 11. As shown in a top view of the magnet segment 11 in FIG. 2b, the superconducting coils 12 are round cylinders with a super alloy core 14. The super-alloy plates 13 are used to complete the magnetic circuit between the superconducting coils 12, thus reducing magnetic losses of jumping an air gap if coils were constructed individually. The two-pole magnet segment 11 is simply rotated horizontally during assembly to make a checkered board pattern on the diamagnetic levitating surface. FIG. 2c shows a single-pole amorphous superconducting metal alloy magnet segment 11a and FIG. 2d shows a top view thereof. The single-pole magnet segment 11a is constructed of metallic glass. Magnet segment 11a is a strong normal magnet until it is cryogenically cooled down to the superconducting temperature. The cooling channels 15 are at the bottom of the magnet segment 11a. The single pole magnet segment 11a is simply polarized N or S to make a N-S checker board pattern.

FIG. 3 illustrates a sectional view of magnet segment assembly 10 comprising magnet segments 11 arranged in series to form a horizontal platform (surface magnets 30) with vertical sides (edge magnets 31). The edge magnet segments 31 are turned up along a radius to prevent liquid or players from spilling or falling off the sides of the generated diamagnetic surface. The diamagnetic force of the edge magnet segments can push liquids or objects away from the edge when oriented perpendicular to the generated diamagnetic surface. Thinner magnet segments are beveled to shape the upward radius turn of the diamagnetic levitation system 5. Magnetic insulation 27 is used to contain the strong magnetic field and prevent leakage to the surrounding environment. A thin layer of thermal cryogenic insulation 26 is used to isolate the magnet segments 11 from the playing environment. The cryogenic insulation can prevent ice or gas hydrate build-up on the field playing surface. A support frame 23 is used to hold the magnet segment assemblies 10 in place to prevent them from being pulled towards the generated diamagnetic levitation surface. Bolts are used to attach the magnet segments 11 to the support frame 23.

Figure 4A:
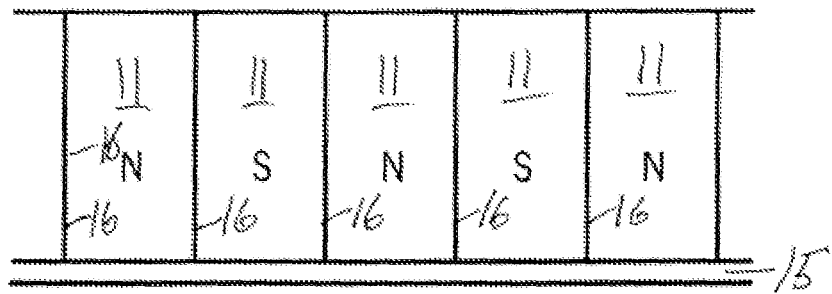
FIG. 4a shows an arrangement of magnet segments in a row of the diamagnetic levitation system.
Figure 4B:
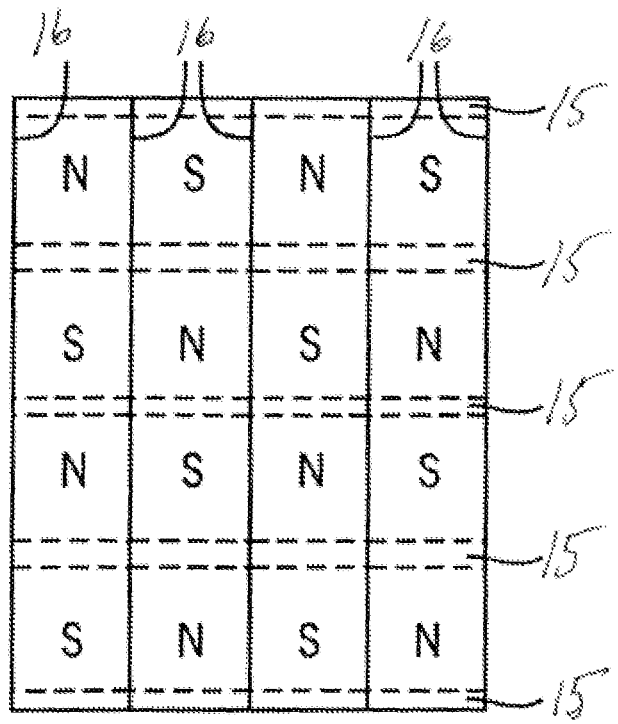
FIG. 4b shows an arrangement of magnet segments in several rows of the diamagnetic levitation system.

FIGS. 4a and 4b show a checkered board assembly pattern for 2×2 and 4×4 preassembled blocks, respectively, for installation into magnet segment assemblies 10 which form the diamagnetic levitation system 5. Preassembled block size is limited by magnetic field strength to prevent damage to humans, shipping containers, or other surrounding computer equipment. Cooling channel 15 (dashed lines) and dry gas channel 16 (solid lines) orientations are also shown. A fiber optic temperature observation array follows the dry gas channels 16 along the diamagnetic levitation surface and insures safe operation on the diamagnetic levitation surface. Cooling channels 15 can be cut with laser, electric wire, or an abrasive jet in the magnet segment assembly 10.

Figure 5:
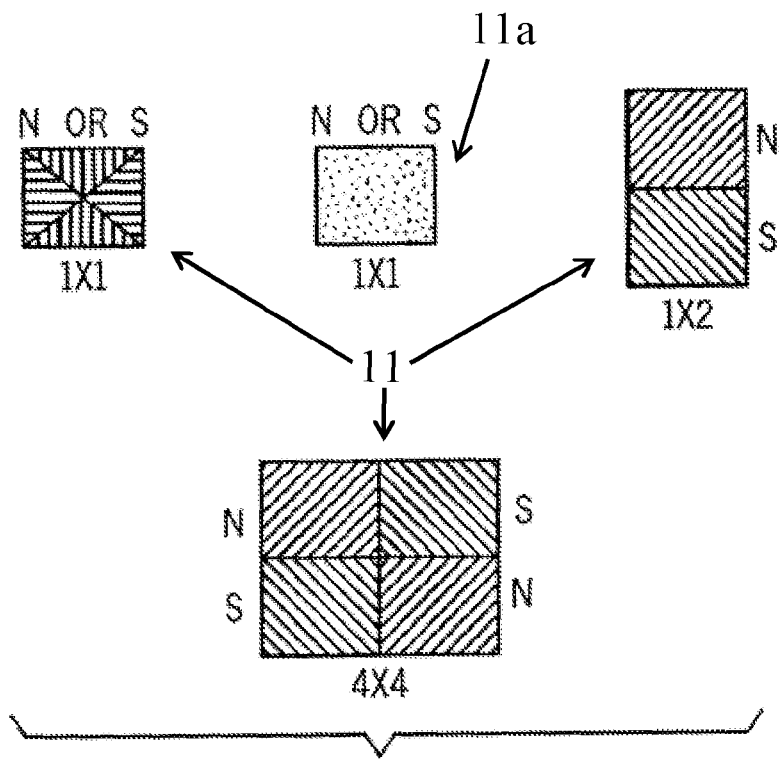
FIG. 5 illustrates plate orientation or amorphous powder shape for superconducting magnet core construction.

FIG. 5 shows a top view of both the thin metal plate 13 of magnet segment 11 and the amorphous metal powder or "metal glass" of magnet segment 11a construction for the superconducting magnetic cores 14. Thin super alloy plate construction is used to prevent magnetic eddy current from heating the magnet segment 11. Compressed amorphous metal powder can also be used to prevent eddy current generation. Plate construction for 1×1, 1×2 and 2×2 segments are shown. Plates can be brazed or e-beam welded together to form a magnet segment 11 or a magnet segment assembly 10.

Figures 6A, 6B:
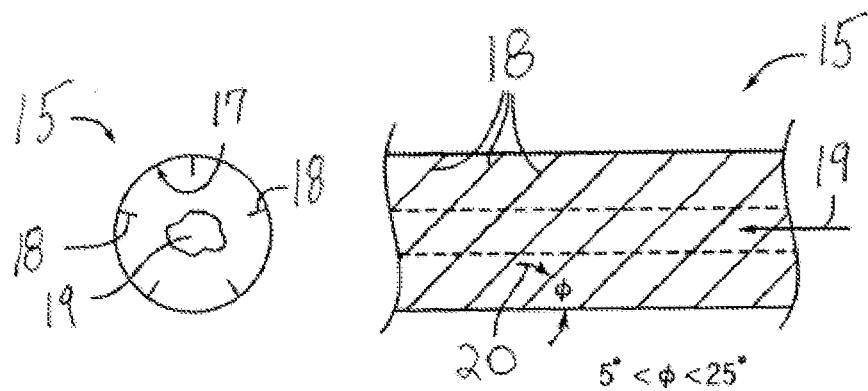
FIG. 6a illustrates a heat exchanger channel for cryogenically cooling the magnet segments wherein the heat exchanger channel has spiral internal fins for uniform liquid boiling along the internal surface of the tube.
FIG. 6b shows that the fin pitch in the cooling channel is at an angle which can vary depending on the liquid and gas injection rates.

FIG. 6a illustrates a heat exchanger channel 15 for cryogenically cooling the magnet segments 11. Cryogenic liquid such as nitrogen is pumped through the channels 15 to cool the magnet segment 11 to superconducting temperature. To absorb heat, the cryogenic liquid boils on the interior surface 17 of the channel. Internal spiral fins 18 are used to insure a uniform liquid film coating across the interior channel surface 17 as the liquid and gas phases flow down the tube 15. The gas bubbles 19 generated from heat absorption by the cryogenic liquid travel down the center of the channel 15. If the gas phase touches the interior surface 17 of the channel 15, it can cause drying and reduce heat transfer from the core material. Helium or Hydrogen gas can be injected with the liquid nitrogen to improve the two-phase flow heat transfer and to increase flow velocities.

FIG. 6b illustrates that the fin pitch 20 of fin 18 is at an angle which can vary from 5 degrees to 25 degrees depending on the liquid and gas injection rates. Cooling channels 15 can be constructed out of copper, nickel or silver metal alloys or carbon fiber-carbon matrix composite. Cooling channel 15 can be compression fit or silver brazed into openings in super-alloy plates 13 to improve heat transfer from the magnet segment 11 to the cryogenic liquid coolant.

Figure 7A:
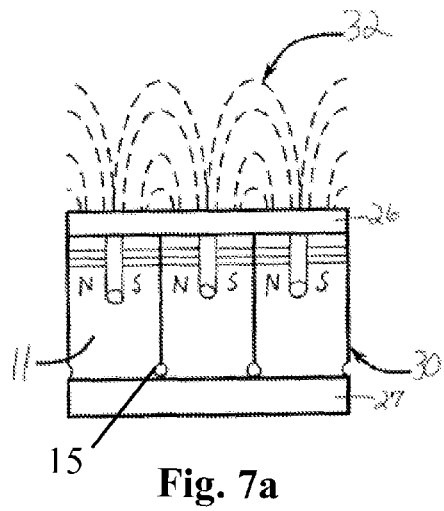
FIG. 7a illustrates the magnetic field height of the surface magnet segments.
Figure 7B:
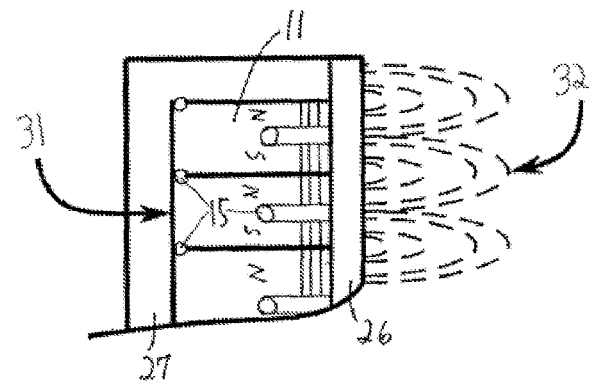
FIG. 7b illustrates the magnetic field height of the edge magnet segments.

FIGS. 7a and 7b illustrate the difference between the magnetic field heights 32 of the surface magnet segments 30 and the edge magnet segments 31 and that the magnetic insulation 27 contains stray magnetic fields. At the corner of each N-S-N-S magnet segment 11, a small jet of dry nitrogen gas is released through the cryogenic insulation 26 to the outside environment. The transpiration of dry nitrogen gas through the upper layer of cryogenic insulation 26 prevents the buildup of condensation in the cryogenic insulation 26. The cooling channel 15 is located at the base (super-alloy plates 13) of the magnet segment 11 and above the magnetic insulation 27.

Condensation of water vapor, hydrocarbons, carbon dioxide, or other gases in the atmosphere would lead to increased heat transfer from the environment to the diamagnetic levitation surface. If the operation temperature rises above the superconducting temperature of the magnet, then the superconducting magnet would fail and leave a dead spot in the diamagnetic levitation field. If the condensation seeped down through the insulation and froze, it could lead to de-bonding of the insulation from the magnet by forming frost which in turn could be propelled upward by the diamagnetic field and damage the cryogenic insulation system.

Figure 8:
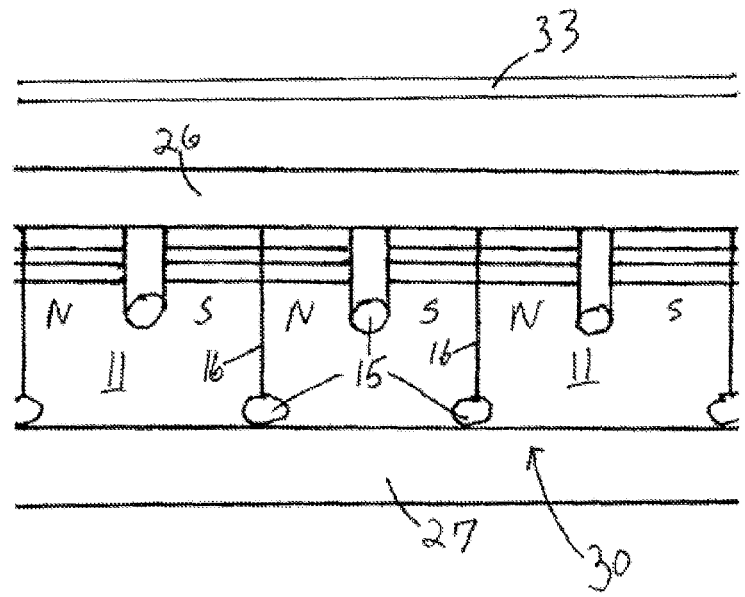
FIG. 8 shows a layer of liquid, such as water, suspended above the surface magnet segments.

FIG. 8 shows that a layer of liquid 33, such as water or low vapor pressure hydrocarbon fluid, can be suspended above the magnet segments 11. The liquid 33 can provide viscous friction to prevent players from slipping on a near frictionless levitation surface and provide friction for moving around on the levitation surface. For example, a player could swim towards a destination or simply float on the film of liquid 33.

The diamagnetic levitation system and playing surface can be in the shape of a circle, a rectangle, or octagon or any other shape, such as an oval shape, for spectator viewing. Players can wear pyro-graphite suits to enhance the diamagnetic constant of the human body and reduce the magnetic field intensity required to levitate the human body. To match the magnet field strength, the space suit carbon fiber volume will be modified to balance the human's density against the magnetic field strength. The space suit is constructed of woven pyrophoric graphite (carbon) fiber and cotton fiber coated with Teflon®. Teflon® prevents conduction of electricity to the human body. Total volume of carbon fiber in the space suit is adjusted to provide a magnetic lifting force slightly above gravitational force. For sport activities requiring the human subject to be parallel to gravitational force (standing up), preferably, a space suit with 15% carbon fiber volume ratio to human subject volume is used at up to 26.5 T magnetic field strength.

The players should not have any ferrous metal parts on or in them due to being dangerously attracted to any of the superconducting magnet segments. Spectators should not have any ferrous metallic objects which could be hazardous to the players since such objects would also be attracted towards the magnet segments. The diamagnetic surface does not have to be level to overcome the gravitational force; in fact it could be used to construct a near frictionless slope for skiing on pyro-graphite board or making a near frictionless water slide or water tube ride.

The foregoing description has been limited to specific embodiments of this invention. It can be apparent, however, that variations and modifications may be made by those skilled in the art to the disclosed embodiments of the invention, with the attainment of some or all of its advantages and without departing from the spirit and scope of the present invention. For example, the support frame may be made of plastic, wood, or both. The levitation system can be designed to produce a tilted levitation playing surface. The magnetic fields can be made to oscillate or vibrate. The diamagnetic levitation system can also be used for medical therapy or entertainment, in addition to games and sports.

It can be understood that various changes in the details, materials, and arrangements of the parts which have been described and illustrated above in order to explain the nature of this invention may be made by those skilled in the art without departing from the principle and scope of the invention as recited in the following claims.

We claim:

1. A diamagnetic levitation system for levitating users to a diamagnetic levitation surface, said diamagnetic levitation system comprising:
    a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
    b) each said superconducting magnet segment assembly having surface magnet segments which maintain said diamagnetic levitation surface and edge magnet segments which prevent objects and users from falling off sides of said diamagnetic levitation surface;
    c) each said superconducting magnet segment having one or more cryogenic cooling tubes to cool said superconducting magnet segment to a superconducting temperature with cryogenic liquid;
    d) each said superconducting magnet segment generating a magnetic field strength up to 30 tesla; and
    e) said cooling tubes having internal spiral fins to produce a uniform film coating of said cryogenic liquid on an interior surface of said cooling tubes, wherein gas bubbles generated from heat absorption by said cryogenic liquid travel down a center of said tube, and wherein said cooling fins have a pitch angle of 5 to 25 degrees.

2. A diamagnetic levitation system for levitating users to a diamagnetic levitation surface, said diamagnetic levitation system comprising:
    a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
    b) each said superconducting magnet segment assembly having surface magnet segments which maintain said diamagnetic levitation surface and edge magnet segments which prevent objects and users from falling off sides of said diamagnetic levitation surface;
    c) each said superconducting magnet segment having one or more cryogenic cooling tubes to cool said superconducting magnet segment to a superconducting temperature with cryogenic liquid;
    d) each said superconducting magnet segment generating a magnetic field strength up to 30 tesla, wherein said cryogenic liquid spins so that said cryogenic liquid boils on said interior surface.

3. A diamagnetic levitation system for levitating users to a diamagnetic levitation surface, said diamagnetic levitation system comprising:
    a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
    b) each said superconducting magnet segment assembly having surface magnet segments which maintain said diamagnetic levitation surface and edge magnet segments which prevent objects and users from falling off sides of said diamagnetic levitation surface;
    c) each said superconducting magnet segment having one or more cryogenic cooling tubes to cool said superconducting magnet segment to a superconducting temperature with cryogenic liquid;
    d) each said superconducting magnet segment generating a magnetic field strength up to 30 tesla; and
    e) each said superconducting magnet segment assembly having one or more dry gas channels to provide jets of air or nitrogen gas, with fiber optic temperature detectors following said dry gas channels to monitor temperature over said diamagnetic levitation surface.

4. The diamagnetic levitation system of claim 1 wherein said superconducting magnet segments are constructed of super-alloy metal plates, metal glass, or compacted metal powder.

5. A diamagnetic levitation system for levitating users to a diamagnetic levitation surface, said diamagnetic levitation system comprising:
    a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
    b) each said superconducting magnet segment assembly having surface magnet segments which maintain said diamagnetic levitation surface and edge magnet segments which prevent objects and users from falling off sides of said diamagnetic levitation surface;
    c) each said superconducting magnet segment having one or more cryogenic cooling tubes to cool said superconducting magnet segment to a superconducting temperature with cryogenic liquid;
    d) each said superconducting magnet segment generating a magnetic field strength up to 30 tesla; and
    e) magnetic insulation and cryogenic insulation.

6. The diamagnetic levitation system of claim 1 further comprising the magnetic field strength of said diamagnetic levitation system being at least 90% of the earth's magnetic field at distances from said diamagnetic levitation system greater than 3 times the width of said superconducting magnet segment.

7. A diamagnetic levitation system for levitating users to a diamagnetic levitation surface, said diamagnetic levitation system comprising:
    a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
    b) each said superconducting magnet segment assembly having surface magnet segments which maintain said diamagnetic levitation surface and edge magnet segments which prevent objects and users from falling off sides of said diamagnetic levitation surface;

c) each said superconducting magnet segment having one or more cryogenic cooling tubes to cool said superconducting magnet segment to a superconducting temperature with cryogenic liquid;
d) each said superconducting magnet segment generating a magnetic field strength up to 30 tesla; and
e) a nonmagnetic frame to support and retain said diamagnetic levitation system.

8. A diamagnetic levitation system for levitating users to a diamagnetic levitation surface, said diamagnetic levitation system comprising:
a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface;
b) each said superconducting magnet segment assembly having surface magnet segments which maintain said diamagnetic levitation surface and edge magnet segments which prevent objects and users from falling off sides of said diamagnetic levitation surface;
c) each said superconducting magnet segment having one or more cryogenic cooling tubes to cool said superconducting magnet segment to a superconducting temperature with cryogenic liquid;
d) each said superconducting magnet segment generating a magnetic field strength up to 30 tesla;
e) said superconducting magnet segment assembly having one or more dry gas channels to provide jets of air or nitrogen gas, with fiber optic temperature detectors following said dry gas channels to monitor temperature over said diamagnetic levitation surface; and
f) a nonmagnetic frame to support and retain said diamagnetic levitation system.

9. The diamagnetic levitation system of claim 8 further comprising said cooling tubes having internal spiral fins to produce a uniform film coating of said cryogenic liquid on an interior surface of said cooling tubes, wherein gas bubbles generated from heat absorption by said cryogenic liquid travel down a center of said tube, and wherein said cooling fins have a pitch angle of 5 to 25 degrees.

10. The diamagnetic levitation system of claim 9 wherein said cryogenic liquid spins so that said cryogenic liquid boils on said interior surface.

11. The diamagnetic levitation system of claim 8 wherein said superconducting magnet segments are constructed of super-alloy metal plates, metal glass, or compacted metal powder.

12. The diamagnetic levitation system of claim 8 further comprising magnetic insulation and cryogenic insulation.

13. The diamagnetic levitation system of claim 8 further comprising the magnetic field strength of said diamagnetic levitation system being at least 90% of the earth's magnetic field at distances from said diamagnetic levitation system greater than 3 times the width of said superconducting magnet segment.

14. A diamagnetic levitation system for levitating users to a diamagnetic levitation surface, said diamagnetic levitation system comprising:
a) open horseshoe or U-shaped superconducting magnet segments connected in series to form a superconducting magnet segment assembly and a plurality of said superconducting magnet segment assemblies connected in series to form said diamagnetic levitation system which generates said diamagnetic levitation surface, wherein said superconducting magnet segments are constructed of super-alloy metal plates, metal glass, or compacted metal powder;
b) each said superconducting magnet segment assembly having surface magnet segments which maintain said diamagnetic levitation surface and edge magnet segments which prevent objects and users from falling off sides of said diamagnetic levitation surface;
c) each said superconducting magnet segment having one or more cryogenic cooling tubes to cool said superconducting magnet segment to a superconducting temperature with cryogenic liquid;
d) said cooling tubes having internal spiral fins to produce a uniform film coating of said cryogenic liquid on an interior surface of said cooling tubes, wherein gas bubbles generated from heat absorption by said cryogenic liquid travel down a center of said tube, wherein said cooling fins have a pitch angle of 5 to 25 degrees, and wherein said cryogenic liquid spins so that said cryogenic liquid boils on said interior surface;
e) each said superconducting magnet segment generating a magnetic field strength of at least 12 tesla;
f) said superconducting magnet segment assembly having one or more dry gas channels to provide jets of air or nitrogen gas, with fiber optic temperature detectors following said dry gas channels to monitor temperature over said diamagnetic levitation surface; and
g) a nonmagnetic frame to support and retain said diamagnetic levitation system.

15. The diamagnetic levitation system of claim 14 further comprising magnetic insulation and cryogenic insulation.

16. The diamagnetic levitation system of claim 15 further comprising the magnetic field strength of said diamagnetic levitation system being at least 90% of the earth's magnetic field at distances from said diamagnetic levitation system greater than 3 times the width of said superconducting magnet segment.

* * * * *